Oct. 24, 1933.　　F. S. DUESENBERG　　1,931,756
TRANSMISSION
Filed March 27, 1931　　7 Sheets-Sheet 1

Inventor:
Frederick S. Duesenberg,
By: Arthur Wm. Nelson
Atty.

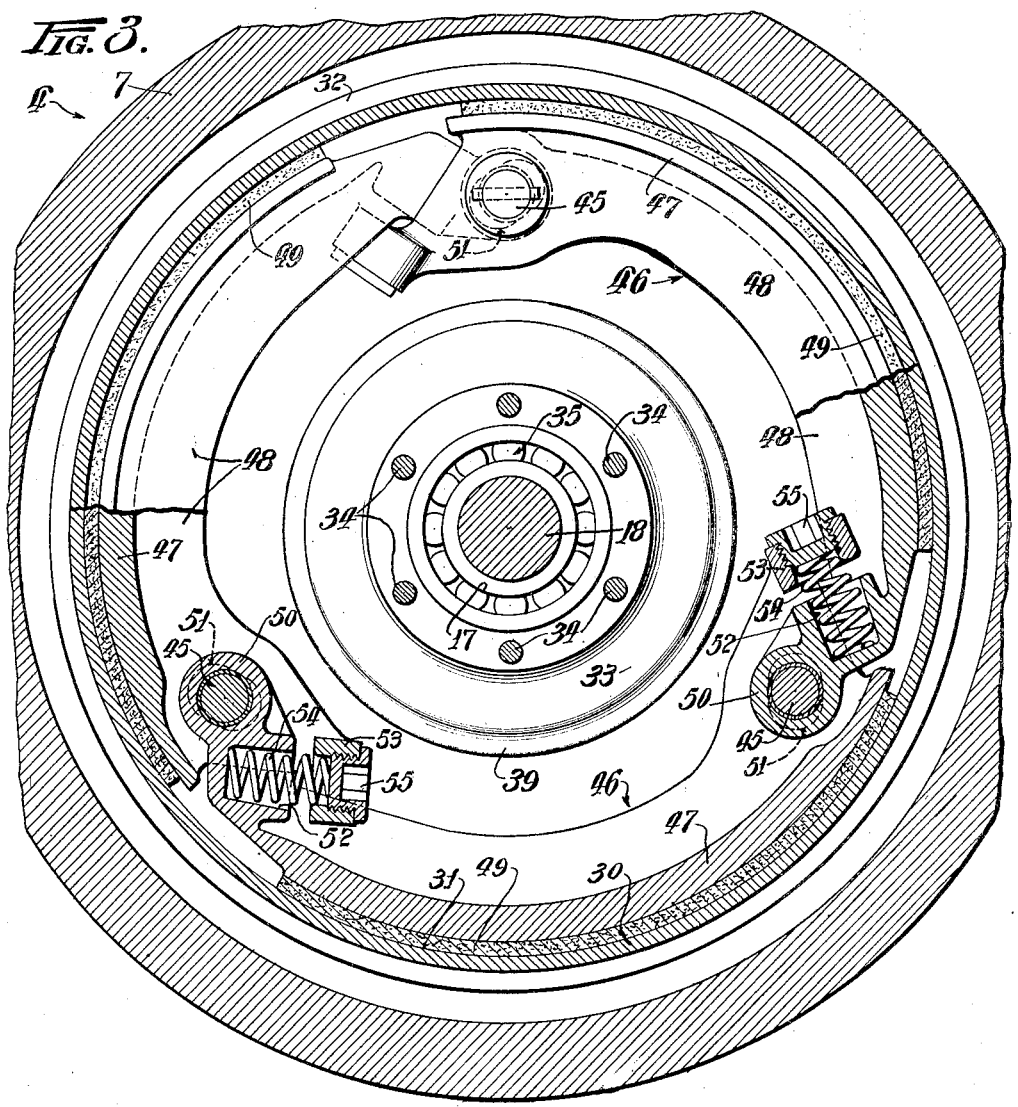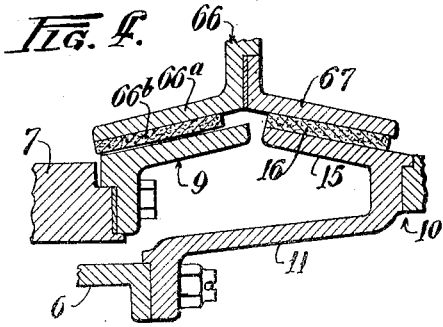

Oct. 24, 1933.　　F. S. DUESENBERG　　1,931,756
TRANSMISSION
Filed March 27, 1931　　7 Sheets-Sheet 4

Inventor:
Frederick S. Duesenberg,
By: Arthur Wm Kleave
Atty.

Oct. 24, 1933.   F. S. DUESENBERG   1,931,756
TRANSMISSION
Filed March 27, 1931   7 Sheets-Sheet 5

Inventor:
Frederick S. Duesenberg,
By: Arthur W. Nelson
Atty.

Inventor:
Frederick S. Duesenberg,
By: Arthur W. Nelson
Atty.

Oct. 24, 1933.  F. S. DUESENBERG  1,931,756
TRANSMISSION
Filed March 27, 1931   7 Sheets-Sheet 7

Inventor:
Frederick S. Duesenberg,
By Arthur Wm Nelson
Atty.

Patented Oct. 24, 1933

1,931,756

UNITED STATES PATENT OFFICE 1,931,756

TRANSMISSION

Frederick S. Duesenberg, Indianapolis, Ind., assignor to Indianapolis Corporation, Indianapolis, Ind., a corporation of Delaware Application March 27, 1931. Serial No. 526,896

14 Claims. (Cl. 74—34)

This invention relates to improvements in transmissions and it consists of the matters hereinafter described and more particularly pointed out in the appended claims.

The primary object of the invention is to provide a transmission especially adapted for automobiles and the like and wherein the driven shaft is operatively connected to the driving shaft at different relative gear ratios, automatically, according to different ranges in engine speed.

Another object of the invention is to provide an automatic transmission in which the change from one gear ratio to a higher ratio upon acceleration of the engine shaft occurs at one speed and the reverse change upon deceleration of the engine shaft occurs at a much lower speed.

Another object of the invention is to provide a transmission of this kind wherein the number of manual selections for the desired gear ratios is materially reduced and these ratios in the higher order are automatically brought about during different speed ranges of the engine.

Still another object of the invention is to provide a transmission wherein means are provided between the driving and driven shafts for driving the driven shaft at a number of different relative speeds and which means is operative to select the desired relative speed between said shafts and the desired speed range of one of said shafts.

A further object of the invention is to provide a transmission of this kind which includes a clutch unit that will automatically disengage at low speeds to avoid stalling of the motor or engine in heavy traffic, by improper handling or improper adjustments.

Still a further object of the invention is to provide a transmission that includes two automatically actuated clutches, one of which engages at the lower engine speed range to connect the driven shaft to the drive shaft at a relatively reduced speed and the other of which engages at a higher engine speed range and coacts with the first to provide a direct connection between said driven and drive shafts.

Still a further object of the invention is to provide a transmission including gearing which when the driving and driven shafts are directly connected revolve as one unit with no gears turning and without churning the lubricant in the transmission.

Still a further object of the invention is to provide a transmission that provides the different gear ratios of the higher order in forward merely by operations of the engine throttle without the necessity of manually shifting gears or throwing the clutch in or out, except when a reduced ratio is desired at high engine and car speeds on mountains or for a quick getaway under extreme conditions.

These objects of the invention as well as others, together with many advantages thereof, will more fully appear as I proceed with my specification.

In the drawings:—

Fig. 3 is a transverse vertical sectional view through one of the clutch mechanisms of the transmission as taken on the line 3—3 of Fig. 2.

Fig. 4 is a detail view of certain cone clutch parts shown at the bottom central portion of Fig. 2 but with said parts in a changed relation.

Figure 1:
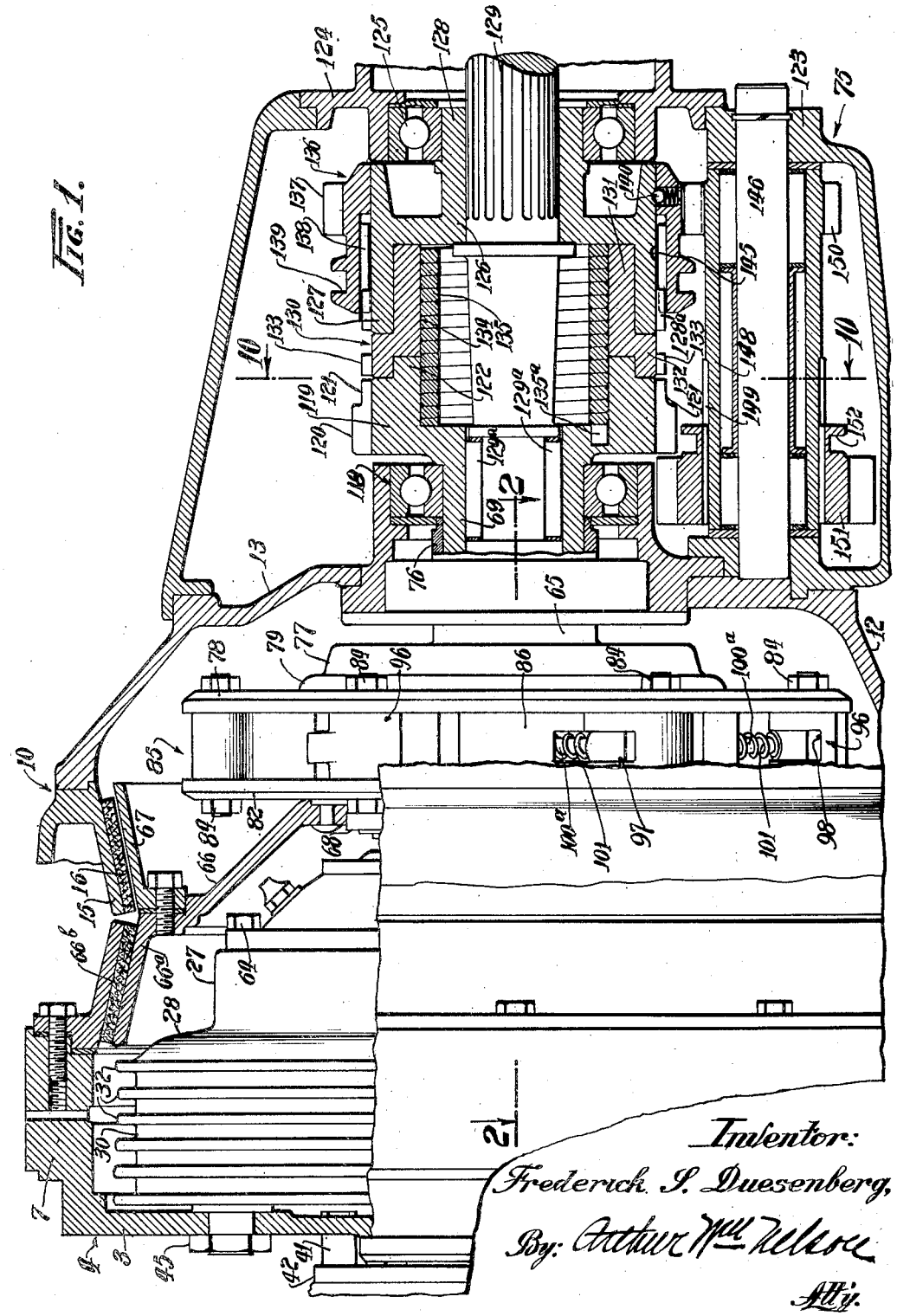
Fig. 1 is a view partly in elevation and partly in longitudinal vertical section of an automatic transmission embodying my invention.

Referring now in detail to that embodiment of the invention illustrated in the accompanying drawings:—1 indicates the rear end portion of the crank shaft of an automobile or like engine having a radial flange 2 thereon to which the web 3 of a fly wheel 4 is secured as by the bolts 5. This fly wheel which is enclosed in a bell housing 6 that is bolted to the engine casing (not shown) includes a rearwardly extending annular flange 7, and bolted to the rear end of the fly wheel flange 7 is a conical clutch ring or flange 9 for a purpose to appear later.

A two part casing 10 is associated with the bell housing and said casing includes a ring 11 bolted to the housing and a second ring 12 bolted to the first ring, said second ring including a substantially radial wall 13 and a flared wall 14. The ring 11 includes a conical fixed clutch ring or flange 15 coned in opposition to the ring or flange 9, and on the inner face of said fixed clutch ring or flange 15 is secured a friction facing 16 such as a good grade of brake lining.

That part of the crank shaft 1 to the rear of the flange 2 is stepped down in diameter to provide a shoulder 17 spaced from said flange, and an extremity 18. The shaft extremity 18 extends into and has bearing within a recess 19 formed in that part 20 of enlarged diameter of a short axially disposed shaft 21. The front end of the shaft part 20 is made to provide a radial spider or flange 22 carrying a plurality of studs 23 on each of which a pinion 24 is mounted. A ring 25 coacts with the rear end of all of the studs 23 to hold the pinions against displacement. If desired, spacer blocks (not shown) may be employed between the flange 22 and ring 25 at points between the pinions, being mounted upon studs similar to the studs 23.

The pinions 24 mesh with the teeth of an internal ring gear 26 carried on an annular flange 27 extending rearwardly from the web 28 of a drum like clutch member 29. Said clutch member includes a forwardly extending annular clutch flange 30 disposed in the plane of the fly wheel flange 7 and said clutch flange has a smooth interior clutch surface 31 and an annularly ribbed exterior surface 32 for heat dissipation. The central part of the web 28 is offset forwardly and has there secured to it a forwardly facing cup 33 by means of bolts 34. This web portion and its cup secure between them, an antifriction bearing 35 which is held up against the shoulder 17 of the shaft 1, by a threaded locking ring 36. To prevent the bolts 34 from loosening up, I interpose a ring 37 between the said parts of said web and the spider flange 22 and which ring has recesses 37$^a$ therein to receive the heads of the bolts to prevent them from turning. Said ring 37 also acts as a spacer and thrust means to receive the thrust of a certain spring hereinafter mentioned and also provides that friction which acts to hold all movable parts snugly together when they revolve as a unit to avoid chatter and rattle from motor and propeller shaft vibration periods.

The cup 33 includes a hub 38 that surrounds that part of the shaft 1 between the shoulder 17 and flange 2 and an annular peripheral flange 39 in which is provided a plurality of notches or recesses 40. Extending through the web 3 of the fly wheel in line with the cup flange 39 is a plurality of pins 41 mounted in an actuating or operating ring 42, of an internal diameter to accommodate the shaft flange 2 when said ring is moved rearwardly as will later appear. This ring also carries a plurality of flat spring fingers 43 to engage the fly wheel web 3 in a manner normally holding the pins 41 out of engagement with the notches 40 in the cup flange 39. An actuator ring 44 surrounds the crank shaft forwardly of the pin carrying ring 42 and this actuator ring which may be moved axially rearward in any suitable manner, will move the ring 42 rearwardly against the action of the spring fingers 43 to engage the pins 41 in the notches 40 when so desired. Thus the clutch drum may be positively locked to the fly wheel regardless of a certain centrifugal clutch means which will now be described.

In the web 3 of the fly wheel is anchored a plurality of rearwardly extending studs 45 and as shown herein there are three of such studs. Associated with said studs are clutch shoes 46 of a channel cross section and each comprising an arcuate web 47 and front and rear inwardly extending flanges 48, each web carrying an exterior friction facing 49 for engagement with the interior surface 31 of the flange 30 before mentioned.

The flanges 48 of each shoe are formed at one end to provide a hub 50 that enters between the other end of the flange 48 of the next adjacent shoe. The hub of each shoe is pivoted on an associated stud 45 and the flanges 48 at the other end of said shoe are formed with short arcuate clearance slots 51 through which extends the stud 45 on which the next adjacent shoe is pivoted. Said flanges 48 of one shoe guides the hub 50 of the next shoe sidewise only, and there is a bearing bushing on each pin for the hub of that shoe pivoted thereon. The slots 51 of each shoe are made on an arc concentric with the axis of the pin on which the shoe is mounted. In each hub is formed a recess 52 coacting with a boss 53 between the extremities of said flanges 48 of the next adjacent shoe to receive a spring 54. Said spring is an expansion one and a plug 55 is threaded in the boss 53 whereby the tension of said spring may be adjusted as desired. Said springs act to swing that end of each shoe having the slots 51 therein, inwardly so that when the fly wheel is not rotating or is only rotating at a very low idling speed, the friction facings 49 just clear the clutch surface 31 of the drum flange 30. So soon as the fly wheel reaches a predetermined speed of rotation, centrifugal force acts to throw the said shoes outwardly to forcefully engage the facings of the several shoes with said surface 31 and thus clutch the said drum to the fly wheel. In this movement of the shoes, the springs 54 are compressed so that so soon as fly wheel speed is slowed down the desired amount the shoes are disengaged from said surface 31.

The front end of a sleeve 56 surrounds and is journalled on the part 20 of enlarged diameter of the shaft 21 and said end of said sleeve is provided with teeth 57 forming a sun gear meshing with the pinions 24. The rear end of said sleeve which extends a suitable distance rearwardly of the shaft part 20 is exteriorly splined as at 58 and between said splined part and the teeth 57 is an annular shoulder 59. The inner race of an antifriction bearing 60 engages at one side against said shoulder and a spring end abutment ring 61 surrounds said sleeve and engages the other side of said race of said bearing. The outer race of said bearing is clamped in supporting engagement between coacting rings 62—63, the former also being engaged against the ring gear 26 and within the flange 27. Bolts 64 secure said ring 62 and the ring gear 26 to the drum web 28. From the above, it is apparent that the clutch member 29 as a whole has a two point antifriction rotative bearing. It is pointed out that by the provision of the annular flange 27, a positive alignment is assured between the ring gear 26, a web 28 and associated gears as well as between the bearings 35 and 60.

Figure 2:
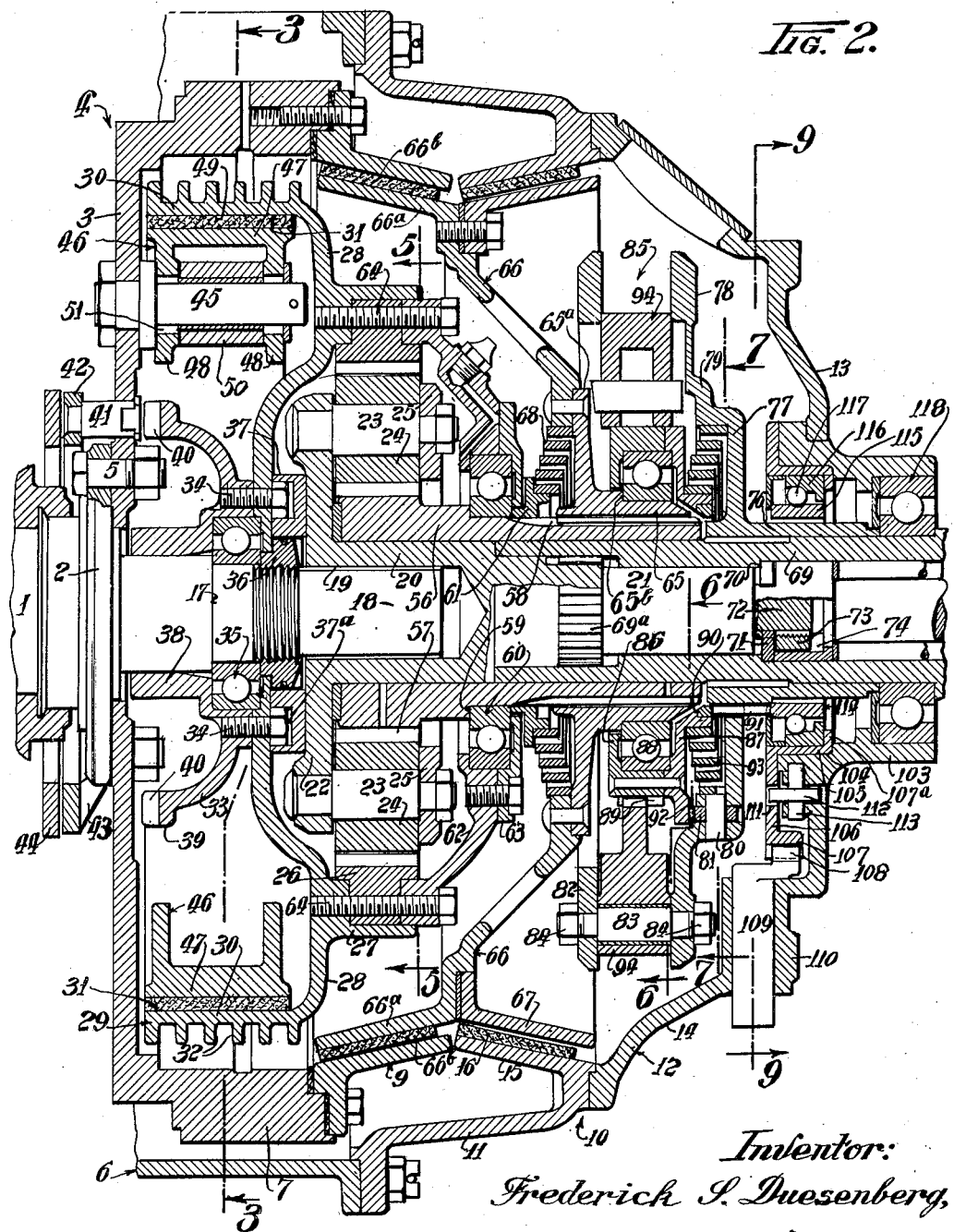
Fig. 2 is a longitudinal, horizontal sectional view on the same scale through the automatic clutch mechanism of my improved transmission, the plane of the section being taken on the line 2—2 of Fig. 1.
Figure 5:
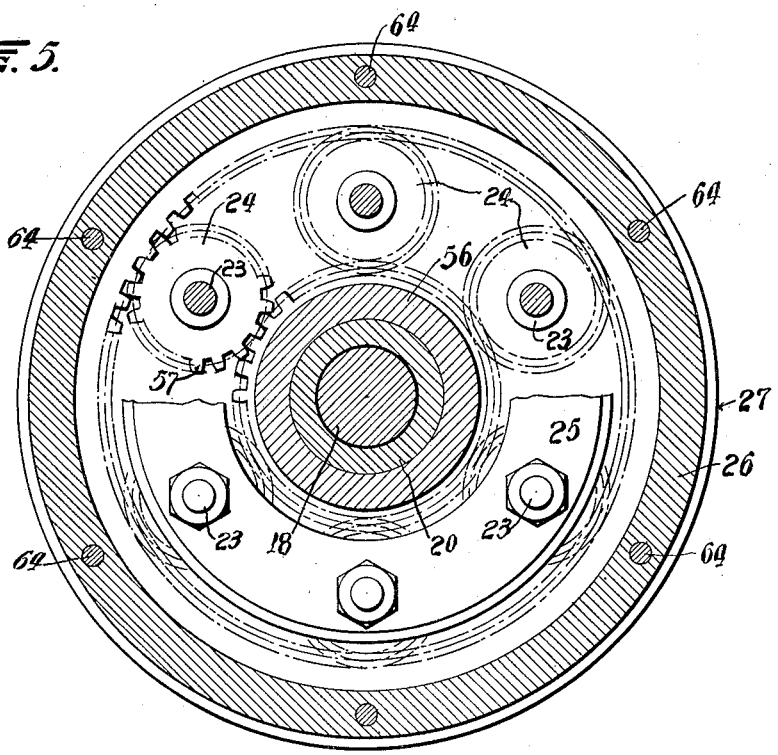
Fig. 5 is a transverse vertical detail sectional view through the transmission and illustrates more particularly the planetary gearing employed therein, the plane of the section being indicated by the line 5—5 of Fig. 2.

Engaged on the splined end 58 of the sleeve 56 so as to rotate therewith and also be capable of a limited longitudinal movement thereon is a hub like member 65 including a radial flange 65ª at its front end. To this flange is riveted a dish like ring 66 including a peripheral flange 66ª having a friction band 66ᵇ secured thereto. This flange is tapered in accordance with the clutch ring 9 on the fly wheel flange 7 and when the hub member 65 is moved axially in one direction, the flange 66ª clutches upon said flange 9 as shown in Fig. 2. When the hub member is moved axially in the other direction, then said flange declutches from said flange 9 as shown in Fig. 4.

Secured to said dish like ring is a clutch flange 67 tapered to correspond with and engage the clutch lining 16 on the fixed ring 15 when said hub member is moved in said other direction as shown in said Fig. 4. A spring 68 surrounds the sleeve 56 between the ring 61 and hub member flange 65ª and normally urges the hub member rearwardly to engage the flange 66ª with the clutch member 9. On said hub member 65 is formed an annular shoulder 65ᵇ, the purpose of which will appear later. While the clutches 9—66b and 16—67 have been shown and described as cone clutches it is to be understood that disk clutches or other forms of clutches may be used in place thereof.

69 indicates a tubular shaft which at its front end extends into the sleeve 56 and has a splined connection with the rear end of the shaft 21 as indicated at 69ª. In said tubular shaft is provided an annular shoulder 70 to receive a notched washer 71 that surrounds a threaded extremity 72 on the shaft 21. On said extremity is threaded a nut 73 which when drawn up tight on said extremity and into engagement with said washer, securely connects said tubular shaft 69 to the shaft 21. A cage 74 is provided in said shaft which has a tongue extending into the notch of said washer, which in turn has an internal tongue engaged in a groove in the shaft whereby the cage and washer not only holds the nut against loosening but the rear face of this cage also provides a spacing and retaining surface for a certain bearing disposed in the rear end of the tubular shaft and hereinafter mentioned. The rear end of this tubular shaft extends through and beyond the wall 13 into a change speed gear, transmission housing or casing 75 fixed to said wall 13 as will later appear in more detail.

Keyed to the tubular shaft 69 just to the rear of the sleeve 56 is the hub 76 of a circular plate 77 that includes a forwardly offset flange 78 connected thereto by an annular shoulder part 79. Anchored in this shoulder part of the plate is a plurality of arcuately spaced pins 80 (Figs. 2 and 7) upon each of which is journalled a roller 81. Spaced forwardly of the flange 78 is a ring 82 connected thereto in desired relation by shouldered pins 83 and associated nuts 84.

Disposed between the flange 65ª of the hub member 65 and the plate 77 is a second and centrifugal high speed clutch mechanism indicated as a whole as at 85. Said mechanism includes a pair of front and rear rings 86 and 87 respectively which retain between them an antifriction bearing 88 that is engaged upon the hub member 65 up against the shoulder 65ᵇ on said hub. The ring 87 constitutes a controlling cam member as will later appear and these two rings are secured together by rivets as shown in Fig. 2. On the periphery of the inner ring are a plurality of sets of gear teeth 89. The inner portion of the outer ring is coned as at 90 in opposition to the extremity of the hub member 65 and said inner portion of said ring also carries a plurality of rearwardly disposed studs 91 that extend rearwardly through and beyond the plate 77, suitable holes being formed in the plate for that purpose.

Figure 7:
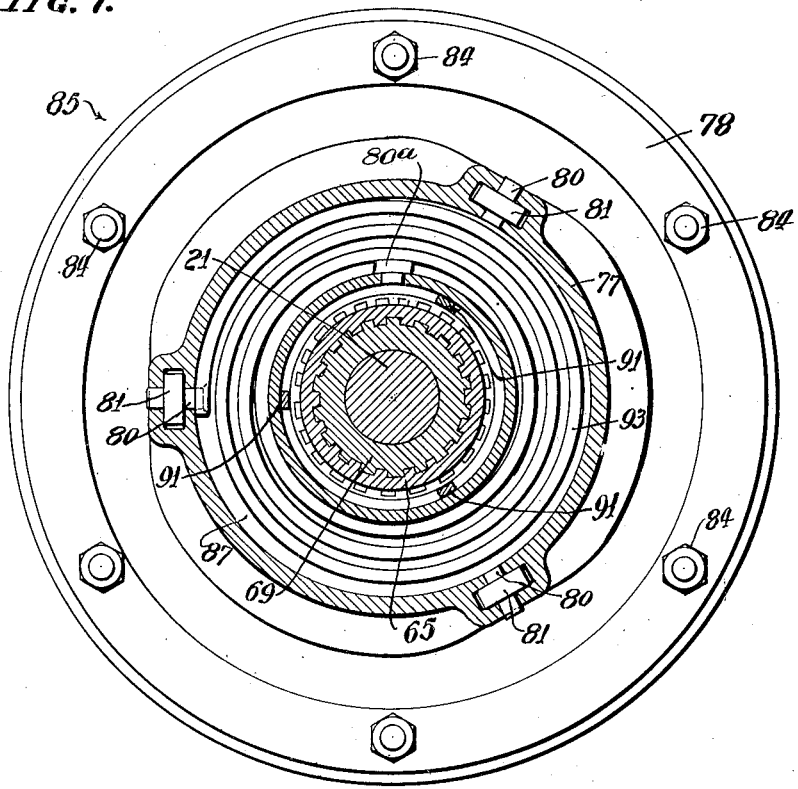
Fig. 7 is another transverse vertical sectional view through the transmission as taken on the line 7—7 of Fig. 2.

A portion of the ring 87 is provided with a rearwardly disposed cam 92 (Figs. 2 and 8) which in the relative rotation between the plate 77 and said inner and outer rings is adapted to engage and ride up on the roller 81 whereby said rings, acting through the bearing 88 will move the hub member 65 forwardly against the action of the spring 68. In this forward movement of said hub member the clutch member 66ª is moved out of engagement with the ring 9 and the clutch member 67 is moved into engagement with the fixed clutch member 15 as shown in Fig. 4. A spring 93 is disposed between the rear ring 87 and the plate 77 to assist the cam and roller in moving the hub member 65 and parts carried thereby forwardly against the action of the spring 68. The spring 93 is weaker than the spring 68 so that said spring 68 operates to hold the clutch 66ª whenever the rollers are off the high points of the cam 92. As shown in Fig. 7 the outer end of the spring 93 is secured to the plate 77 by means of the pin 80 upon which is journalled one of the rollers 81. The other or inner end of the spring abuts against a stop pin 80a secured to an annular projecting portion of the ring 87 carrying the cams 92.

Pivotally mounted on each of the several pins 83 and positioned between the plate flange 78 and ring 82 is weight member 94 having a peripheral gear tooth portion 95 engaged with the like portions 89 of the ring 86. Each weight includes a relatively long and heavy load arm 96 on one side of the tooth portion 95 and a shorter power arm 97 on the other side of said tooth portion. In each load arm is provided a recess 98 through which extends a rock shaft 99 and pivoted at 100 in each load arm is the shoulder end of a spring guiding pin 100ª, the other end of which slides through an opening in the rock shaft 99 of the next adjacent weight member. An expansion coil spring 101 surrounds each guide pin 100ª which normally tends to swing the load arm end of the weight member in toward the periphery of the ring 86. By interconnecting the weight members 94 as described proper balance of the controlling mechanism during operation thereof is assured.

Figure 6:
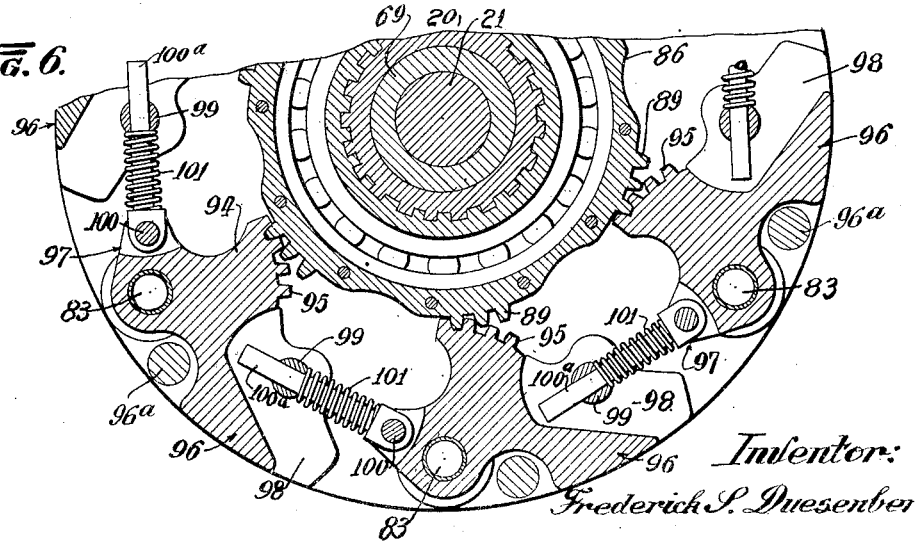
Fig. 6 is a transverse vertical sectional view through the same as taken on the line 6—6 of Fig. 2 in which the weights are shown in outward position as in "high" direct drive.
Figure 8:
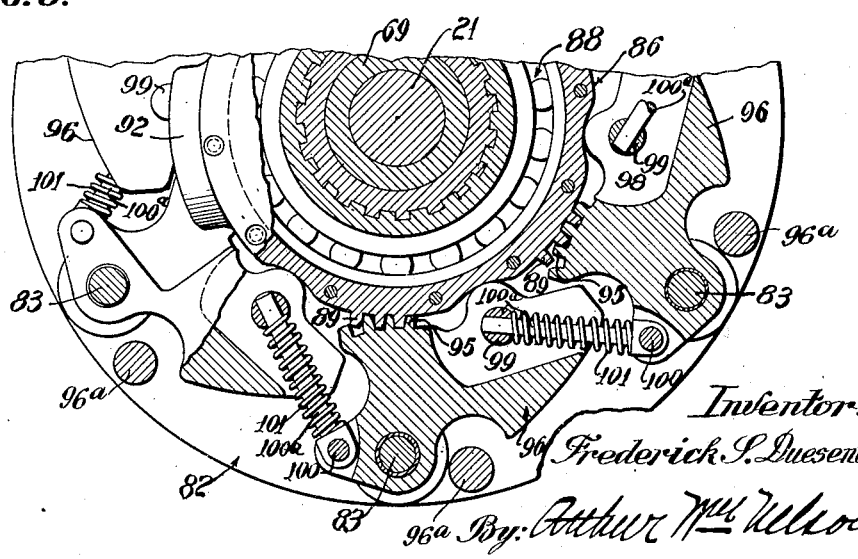
Fig. 8 is a view similar to Fig. 6 with the parts in a changed relation showing parts in static or low speed position.

A stop pin 96a is provided to limit the outward movement of the weight arms 96 of each of the weight members 94 as shown in Figs. 6 and 8. These pins may be so positioned as to stop outward movement of weight arms 96 just before the line of action of the spring 101 reaches the dead center line between adjacent pivot pins 83, or just as the line of action of the spring 101 reaches the dead center position, or just after it passes the dead center position. As shown in Figure 6 the stop pins 96a are so positioned as to allow the line of action of the spring 101 to pass the center line between adjacent pivot pins 83 but it is to be understood that the particular location of the stop pins is to be determined by the conditions under which it is desired to operate a vehicle in which the mechanism of the present invention is embodied.

When the parts, thus far described, are at rest, as when the crank shaft 1 is non-rotative, the cam 92 of the ring 87 is engaged with the roller 81 and when said parts are in this position the hub member 65 will be in its forward position. Thus the high speed clutch 66ª is out of engagement with the member 9 on the fly wheel and the clutch member 67 is engaged with the fixed clutch member 15 and the spring 68 is under compression.

After the engine has been started, it is apparent that the crank shaft 1 will have several ranges of speed according to the acceleration given the engine. In the low idling speeds neither the slow speed gear clutch (the drum 28 and shoes 48) or the high speed gear clutch actuating means 85 is effected by centrifugal action. So soon as a low running speed of the engine above idling speed is attained, centrifugal force acts upon the shoes 48 to throw them outwardly to engage the surface 31 of the drum 28 and thus operatively connect said drum and fly wheel together. In the rotation of this drum, the ring gear 26 will drive the pinions 24 which will roll around the sun gear 57 which is held stationary by the engagement of the clutch surfaces 15 and 67 as before described.

Thus with the pinions being so driven, the flange 22 of the tubular shaft part 20 is being driven from the clutch drum 28 at a differential in gear ratio so that said shaft part 20 is being driven slower than is the speed of the crank shaft. With the tubular shaft 69 splined to the shaft part 21 it is apparent that said tubular shaft is being driven at the speed of said shaft part 21.

As the circular plate 77 is splined to the tubular shaft 69 it rotates therewith as do all parts associated therewith such as for instance, the rings 86 and 87 and the centrifugally operated clutch actuating means 85, because of the antifriction bearing 88.

As the engine is accelerated to another and higher speed range the weight members 94 fly outwardly under centrifugal force against the action of the springs 101 which are compressed. At this time the supporting pins 100ª for said springs swing into the plane as defined by a line extending through adjacent pivot pins 83 for said weight blocks depending, of course, upon the particular location of the stop pins 96a. Because of the engagement the teeth 95 of said blocks, have with the tooth part 89 of the ring 86, a relative rotative movement with respect to the plate 77 is imparted to the said ring 86 and its associated ring 87. Due to this relative rotation of the rings 86 and 87 and the plate 77, the cam 92 is turned with respect to the roller 81 of the plate 77 thereby disengaging the cam 92 from the roller 81 so that the spring 68 acts to shift the hub 65 rearwardly to engage the member 66ª with the clutch ring 9 of the fly wheel and disengage the member 67 from the stationary clutch member 15. This relative rotative movement between the plate 77 and the rings 86 and 87 is opposed by the spring 93, which, when the centrifugal force reaches a predetermined amount, yields and is compressed spirally by reason of its connection to the plate 77 and ring 87 as shown in Figure 7.

Thus the drive in this higher engine speed range is not only through the fly wheel to the member 66ª and hub 65 to the tubular shaft 56 and sun gear 57 but is also through the fly wheel to the clutch drum 28 to the ring gear 26. As the ring gear and sun gear are now both driven at the same speed it is apparent that the pinions 24 are locked between said gears to be driven thereby so that the shaft 21 is driven in direct one to one ratio with respect to the crank shaft. As the tubular shaft 69 is splined to the shaft 21 the same is driven thereby.

It is apparent that when the engine shaft is in the low speed range the shaft 21 is being driven at a speed less than the speed of rotation of said engine shaft through only one clutch. However, when the shaft 21 is being driven directly during the higher range of engine speed, then the drive is through not only the clutch drum 28 but also through the clutch member 66ª and fly wheel so that the clutching effect is practically doubled in such direct drive at such high speed ranges.

The combination of the clutches and speed reducing mechanism described with the mechanism for effecting axial movement of clutch ring 66 on sleeve 56 to cause shifting from one speed ratio to the other affects the shifting from the lower to the higher speed ratio, upon acceleration of the engine shaft, at a predetermined speed of the engine shaft and the reverse change upon deceleration of the engine shaft at a much lower speed. In the shifting from the lower to the higher speed when the fly weights 94 fly out the speed of the engine shaft is equal to the speed of the driven shaft multiplied by the reduction ratio, whereas when shifting from the higher back to the lower speed the speed of the engine shaft is equal to the speed of the driven shaft when the fly weights 94 are forced inwardly by springs 101 and 93. The interconnection of the fly weights, as described, provides for the shifting from the higher back to the lower speed at a greatly reduced speed of the engine shaft from that at which shifting from the lower to the higher speed occurred. The reason for this difference is that when the weight arms 96 are in their inward position, as shown in Figure 8, the springs have a strong tendency to keep the weight arms in this position due to the length of arm between the axis of the pivot pins 83 and the line of action of the spring 101, whereas when the weight arms are in their outward position, as shown in Figure 6, the length of arm between the axis of the pivot pins 83 and the line of action of spring 101 is reduced to a very small value. While the springs 101 exert a greater force against pins 99 when the weight arms are in their outward position because of being compressed to a greater amount than when the weight arms are in the inward position, yet the length of arm between the pins 83 and the line of action of the springs 101 decreases so much faster, upon outward movement of the weights, than the value of the force under which the springs are compressed increases that the result is that the springs 101 have a greater tendency to hold the weights in when in their inward position than to force the weights in after they have assumed their outward positions due to centrifugal force. The speed at which the shifting back from the higher to the lower speed ratio will depend, of course, upon the particular location of the stop pins 96a, but in cases where the mechanism is designed to cause shifting up at a speed of 1200–1500 R. P. M. of the engine shaft the reverse shifting will occur at a speed of around 600 R. P. M. of the engine shaft. In instances where the stop pins 96a are so positioned as to allow the springs 101 to pass the center line between adjacent pivot pins 83, the springs 101 will act to maintain the weight arms 96 in the outward position upon reduction in speed of the engine shaft. In such case, however, and in the instance where the stop pins 96a are so positioned as to stop the arms at a position to cause the line of action of springs 101 to fall on dead center with respect to the adjacent pivot pins 83, the springs 93 which have been compressed spirally upon movement outward of the weighted arms 96, as previously pointed out, will upon deceleration of the engine shaft force the pins 100ª, and hence the springs 101, to the inside of the center line between adjacent pivot pins 83 and the springs 101 will then act to return the weight arms 96 to their inward position and thereby cause a relative rotative movement between the rings 86, 87 and plate 77 to move the cams 92 out of engagement with the rollers 81 whereupon the hub 65 of clutch ring 66 is shifted rearwardly by spring 68 to cause a shifting from the higher back to the lower speed. This shifting back, however, occurs, as just explained, at a speed much less than the speed at which shifting from the lower to the higher speed occurred.

Another advantage of the particular construction and arrangement of the fly weight mechanism is that a very quick shifting of the clutch ring 66 to change from one speed ratio to the other is accomplished, since when the fly weights 94 start to move in one or the other direction they will continue to move at an accelerated rate of speed due to the changes in resultant forces exerted by springs 101 upon the fly weights, as above described. By accomplishing this quick shifting action excessive speeding up of the engine during the shifting operation is precluded. Also, excessive slipping and hence wear on the clutch linings 16 and 66ᵇ is prevented since the clutch ring 66 cannot stop at any intermediate position.

It is apparent from the foregoing, that the driven shaft is capable of being driven from the drive shaft at different relative speeds and the selection or bringing of these relative speeds into operation is automatically controlled by the speed of rotation of the driving shaft.

It may be desired under certain conditions, as when ascending long steep grades where direct speed from the engine shaft would produce extreme strains or exertions, on the motor, to move the high speed clutch 66ª out of engagement with the fly wheel while the engine is still operating in its high speed range. In this manner the drive would be at a gear reduction to the tubular shaft 69 when the engine is in its high speed range so that said engine is relieved of such strains when so ascending said grade. I have provided a simple and novel means for such purpose and such means are as follows:—

Figure 9:
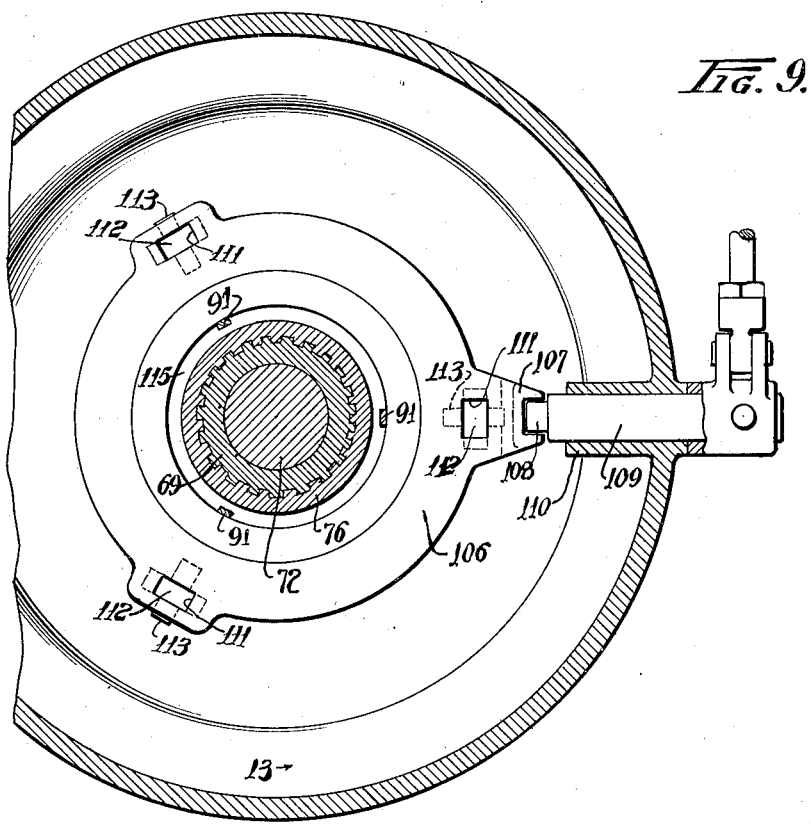
Fig. 9 is a further transverse vertical sectional view through the transmission as taken on the line 9—9 of Fig. 2.

In the radial flange 13 of the member 12, I secure a sleeve 103 formed at its front end with an internal seat 104 to receive a ring 105 with an outwardly extending front end radial flange 106 and an inwardly extending rear end radial flange 107ª. See Figs. 2 and 9. At one point the ring flange 106 is increased in depth to provide a notch 107 in which is engaged a crank pin 108 on the end of a rock shaft 109 journalled in a boss 110 provided in the flange 13. In said ring flange 106 is provided a plurality of openings 111 each to receive a part of an associated roller 112 each mounted on a shaft or pin 113 provided therefor in the sleeve 103.

In the ring 105 is engaged an antifriction bearing 114 which embodies the characteristics of both a radial and an end thrust bearing. Said bearing includes inner and outer retaining rings 115 and 116 for balls 117, the inner ring being so positioned as to engage the studs 91, previously mentioned when the bearing as a whole is moved axially forward.

When it is desired to so move said bearing forwardly, the shaft 109 is rocked in any suitable manner and this imparts a slight turning movement to the ring 105. In this turning movement of the ring, the end of the slots 111 therein will engage and ride upon their associated rollers 112 and this will impart a forward axial movement to said ring and will engage the inner retaining ring 115 of the bearing 114 with the studs 91. Thus a forward axial movement is imparted to the members 86 and 87 and through the bearing 88 to the hub 65 to disengage the clutch member 66ª from the associated clutch part 9 and engage the clutch member 67 with its associated clutch part 15. This holds the sun gear 57 against movement so that the shaft 21 is driven at a lower gear ratio than heretofore.

Thus it is possible to manually cause the shaft 21 to be driven at a low gear ratio independent of the automatic means before described.

If it is desired to run the engine at a high speed without transmitting the power to the propeller shaft the rock shaft 109 is turned only an amount sufficient to maintain the clutch ring 66 in a position intermediate its extreme position to prevent engagement of either of the clutches carried by the clutch ring 66.

When the conditions necessitating the manual operation, have passed, the rock shaft 109 is operated in the reverse direction when the spring 68 will automatically move the member 66 to throw in the high gear ratio clutch member 66ª and to throw out the low gear ratio clutch 67.

In the rear end of the sleeve 103 is supported an antifriction bearing 118 for the rear end of the driven tubular shaft 69 and that end part of said shaft beyond the said bearing is enlarged to form a cup like clutch member 119. On the exterior of this clutch member are gear teeth 120 having rear end dedendum portions 121. On the extremity of this clutch member is an annular flange 122.

The casing 75 before mentioned includes a rear wall 123 in which is located a plate 124 supporting an antifriction bearing 125 for a second clutch member 126. This second clutch member includes an annular flange 127 at its front end and a hub 128 at its rear end engaged in said bearing 125. This hub is splined to the rear end portion of a power take off shaft 129, the front end of which is reduced in diameter to engage in a roller bearing 129ª disposed in the tubular shaft 69 just to the rear of the nut 73 and its retainer 74. On the front end part of the clutch flange 127 are dedendum teeth 128ª.

Between the clutch parts 119 and 127 is a clutch ring 130 with a rear end part 131 of reduced diameter engaged within the flange 127 of the clutch part 126 and with a part 132 of enlarged diameter engaged on the flange part 122 of the clutch part 119. On the front end of said part 132 of said ring are dedendum teeth 133. The ring 132 coacts with the clutch part 119 to provide a clutch spring recess 134 in which is located a coiled clutch spring 135. One end of this spring is formed with a toe 135ª that is anchored with respect to the clutch member 119, the other end being free with respect to the clutch ring 130. With the part 132 engaged with an overhanging or embracing relation, with respect to the part 122 of the clutch member 119 as shown, a collar or step arrangement is provided that will not allow the inner peripheral surface of said parts, engaged by the clutch spring, to get out of alignment. This will give a freer and better operation for the spring and will give it a longer life.

Associated with and normally surrounding the clutch member 126 but capable of a longitudinal movement therein, is a collar 136. On the rear end of said collar are external gear teeth 137 and in the front end of said collar are relatively long internal gear teeth 138. Said collar is also provided externally with an annular groove 139. The internal teeth 138 of the collar are of such length as to be capable of spanning the teeth 128a—133 and 121 before mentioned, when said collar is moved axially forward to its full limit at which time a spring pressed ball 140 in the rear of said sleeve will engage in a notch or recess 145 in the clutch member 126 to releasably hold the parts in this position.

Should it be so desired, similar spring pressed holding devices may be employed in the usual shift rods or rails of the transmission not illustrated herein, with the same effect as is provided in the construction described.

Figure 10:
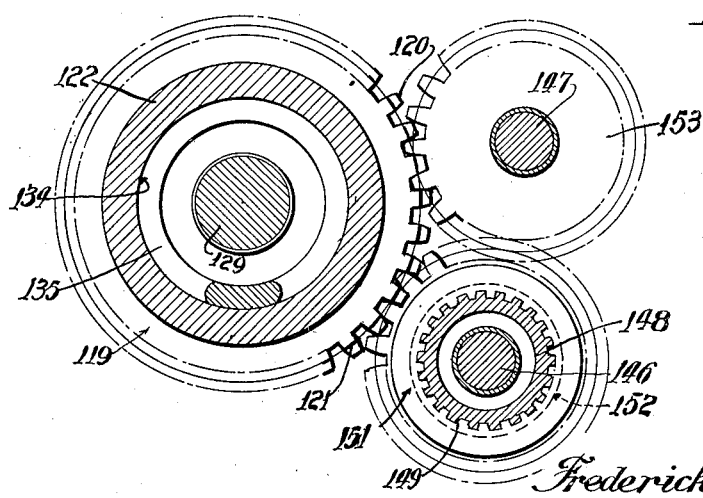
Fig. 10 is a transverse vertical sectional view thrqugh the change speed gearing of the transmission affording first and reverse speeds therefor, the plane of the section being taken on the line 10—10 of Fig. 1, and Figs. 11 and 12 are detail fragmentary views in side elevation of the gearing shown in Fig. 10 and will be more fully referred to later.

In the casing 75 are provided two shafts 146—147 respectively arranged parallel with the shaft 129. See Fig. 10. On the shaft 146 which corresponds to the counter shaft in the ordinary change speed transmission, is journalled a counter shaft sleeve or bushing 148 (Fig. 1) which is splined as at 149 at its front end and is provided with a pinion 150 at its other end. This pinion is adapted to be engaged by the teeth 137 of the shiftable sleeve or collar 136 when the same is in its rearwardmost position. Longitudinally shiftable on the splined front end of this sleeve is a pinion 151 which constitutes the low gear pinion of the transmission. This pinion is formed with an annular grooved end 152 to receive a shifter yoke (not shown) whereby said pinion may be moved into and out of engagement with the gear teeth 120 of the cup like clutch member 119.

When the pinion 151 is in engagement with said gear teeth 120 and the teeth 137 of the collar 136 are in engagement with the teeth 150 of the sleeve 148, then the drive is from the cup like clutch member 119 through the pinion 151 and sleeve 148 to the collar 136 and through the internal teeth 138 thereof to the teeth 128a of the member 126. As this member is splined to the shaft 129 it is apparent that the same is driven thereby.

The shaft 147 is tubular and rotative as well as longitudinally shiftable thereon. Within the desired limit is a pinion 153 which constitutes the "reverse" pinion of the transmission. The pinion is also provided with an annularly grooved rear end 154 (Figs. 11 and 12) adapted for engagement by a shifter yoke (not shown). The reverse pinion is in constant mesh with the first speed pinion 151 and is adapted to be shifted longitudinally into and out of engagement with the gear teeth 120 of the cup shaped clutch member 119.

Figure 11:
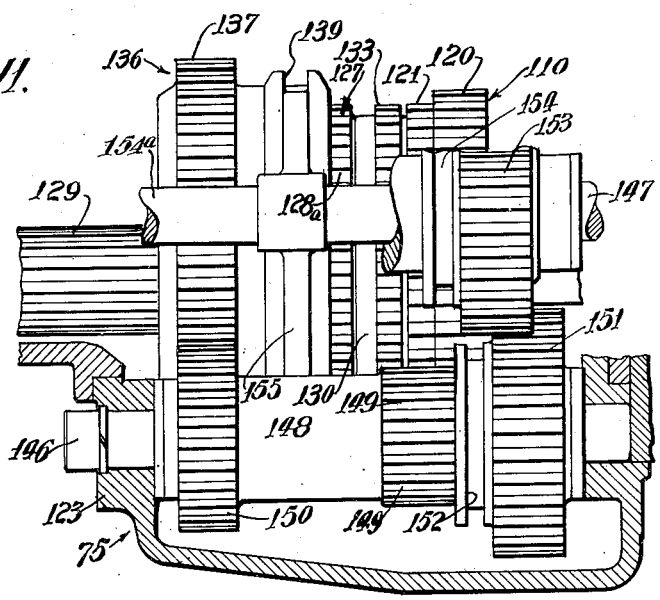
Figure 12:
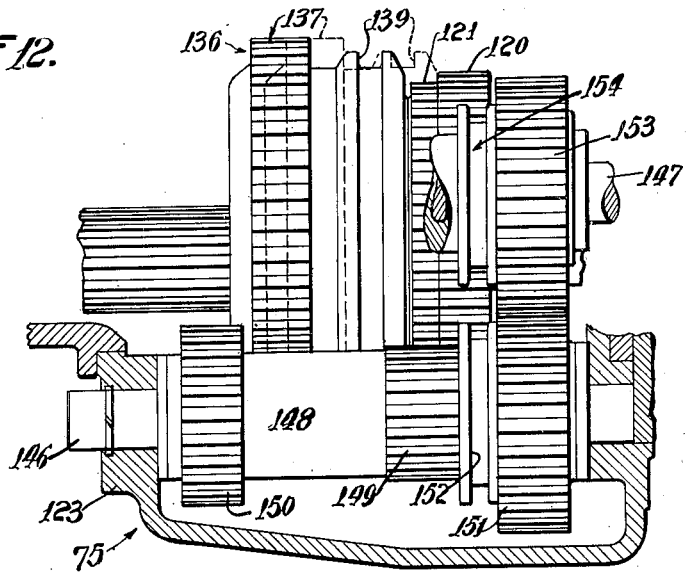

A single shift lever (not shown) is associated with the pinions 151—153 to select the desired one for engagement with the teeth 120 of the cup shaped clutch member 119. It is understood, of course, that both pinions are never at the same time in mesh with said teeth 120 and that the pinion 153 is not normally in mesh therewith but is in constant mesh with the pinion 151. When the pinion 153 is in mesh with said teeth 120, the pinion 151 is out of engagement therewith but is still in engagement with pinion 153 as shown in Fig. 11. When the pinion 153 is in engagement with said teeth 120 then the drive is from the cup member 119 to the pinion 153 and from there to the pinion 151 whereby a reverse rotation is imparted to the sleeve 148 with a resulting reverse rotation through the collar 136 and member 126 to the shaft 129.

Axially of the tubular shaft 147 for the reverse pinion is arranged a shifter rod 154a which has fixed to it yoke 155 adapted for engagement with the annular groove 139 in the collar 136 whereby shifting movement imparted to said rod in any suitable manner will impart a like movement to said collar.

The collar 136 has what may be aptly termed three stages of movement or position, which are as follows:—

First, and normally wherein it is engaged only with the member 126. When shifted forwardly into the second or next position its teeth 138 connect the members 126—130 together. When shifted into the third or last position the teeth 138 of the collar 136 connect the teeth 121 of the cup member 119, the teeth 133 of the member 130 and the teeth 128 of the member 126 together.

When the collar 136 is in that position connecting the members 126 and 130 together and the first or low speed pinion 151 is out of mesh with the teeth 120 of the cup shaped clutch member 119, then said clutch member energizes the associated end of the clutch spring 135 causing it to change its normal diameter and clutch the member 130 to said member 119. Should the shaft 129 tend to rotate faster than the cup member 119 as when descending a grade or the engine is decelerated, then said shaft 129 overruns said cup member 119. Thus free wheeling is attainable upon driving the shaft 69 through the reduced drive or the direct drive from the flywheel 7 when the low speed pinion 151 is shifted forwardly out of mesh with the teeth 120 of cup shaped clutch member 119.

When the collar 136 has been shifted further forward to operatively connect the clutch member 119, and the members 130 and 126 respectively together, then this in effect locks the shaft 129 directly to said cup shaped clutch member 119.

The only time that the collar 136 is in its rearwardmost position is when the first speed gear 151 or reverse gear 153 has been selected in which instance the free wheeling action is inoperative for that particular purpose.

Under normal operating conditions the transmission is operated with the collar 136 in a position to lock the clutch member 126 and ring 130 together. In this position the low speed pinion 151 is out of mesh with gear teeth 120 on clutch member 119 as previously pointed out. After the engine has been started and the flywheel has attained a speed above idling speed the clutch shoes 46 are thrown outwardly by centrifugal force to connect the drum 28 to the clutch shoes.

The drive from the engine shaft 1 is then through flywheel 7, clutch shoes 47, drum 28, ring gear 26, planetary gearing 24, flange 22 of shaft 20, shaft 69, clutch cup 119, clutch spring 135, clutch ring 130, collar 136 and cup 126 to propeller shaft 129. This connection of the engine shaft to the propeller shaft corresponds with "second" speed in the conventional type of three speed forward transmission. Upon further acceleration of the engine speed, the weight arms 96 are caused to fly outwardly and this produces a shifting from the reduced drive to a direct drive between the flywheel 7 and the shaft 69 as hereinbefore set forth. This connection of the engine shaft to the propeller shaft corresponds with "high" or "third" speed in the conventional type of three speed forward transmission. With the collar 136 set to lock clutch member 126 and ring 130 together free wheeling action in these two speed ranges is attained. It will be unnecessary under ordinary conditions to use the low gear pinion 151 when starting the automobile from a stand still position but it may be so used if desired. The provision of the low gear pinion is mainly for use in maneuvering or parking the automobile or when the engine is subjected to heavy loads as when driving through sand or up a steep grade.

It will be understood from the foregoing description that, if desired, the engine shaft 1 may be connected up to the propeller shaft 129 in two different gear ratios while the low gear pinion 151 is in mesh with the gear teeth 120 of clutch member 119. The lowest gear ratio between the two shafts occurs at relatively slow speed of the engine when the flywheel 7 is connected to shaft 20 through the planetary reducing gears 24 and the higher gear ratio occurs when the connection between the flywheel 7 and shaft 20 is direct. Thus two low gear ratios may be obtained between the engine shaft and the propeller shaft when the low gear pinion 151 is in engagement with gear teeth 120 of clutch member 119. When the drive is through the counter shaft 148 the collar 136 is in the position shown in Fig. 1 and the ring 130 is free to rotate in clutch member 126 thereby rendering the free wheeling device ineffective. The effect of the combination of the automatically shifting mechanism with the manually shiftable low gear pinion 151 is to provide a four speed forward transmission.

The pinion 151 may be shifted out of mesh with the gear teeth 120 of clutch member 119 when the collar is in its rearwardmost position as shown in Fig. 1 thereby providing a "neutral" so that the driving shaft may be rotated at any speed independently of the propeller shaft.

In case it is desired to operate the vehicle without the free wheeling feature it is merely necessary to shift the collar 136 forwardly until the internal teeth 138 thereof mesh with the teeth 121 of clutch member 119 to thereby lock the two clutch members 119 and 126 together.

Assume now that for any reason it becomes necessary to connect the drum 28 directly to the fly wheel at a speed range below that which causes the shoe under centrifugal action to so connect said drum and fly wheel. Under such conditions, the member 44 is moved rearwardly to shift the ring 42 in a similar direction so as to engage the stud 41 with the recesses 40 in the cup flange 39. Thus the drive will be through the fly wheel direct to the flange 39 and drum 28 to the ring gear 26 and to the shaft part 21 as before described at a reduced gear ratio. The construction described is advantageous as an aid in starting the automobile by pushing when the battery is exhausted and the starting crank is not available.

The construction described, is efficient and quiet in operation and relieves the operator of the necessity of making the several manual shifts now required in the conventional transmissions, under normal driving conditions.

When the transmission is operating in direct or high gear, no gears are turning and this not only provides a more silent mechanism but it eliminates the churning and heating of the lubricant with attending loss in viscosity.

While in describing the invention, I have referred in detail to the form, arrangement and construction of the several parts thereof, the same is to be considered merely as illustrative only so that I do not wish to be limited thereto except as may be specifically set forth in the appended claims.

I claim as my invention:—

1. In a transmission, a driving shaft, a driven shaft and a duplex clutch automatically shiftable in response to changes in speed of the driving shaft for connecting said shafts at different speed ratios, said duplex clutch operating at a predetermined speed of the driving shaft to cause a change from a low to a higher speed ratio upon acceleration of the driving shaft and to cause another change from the high back to the lower speed ratio upon deceleration of the driving shaft to a speed less than that at which shifting from the low to the higher speed ratio occurred.

2. In a transmission, a driving shaft, a driven shaft, a duplex clutch automatically shiftable in response to change in speed of the driving shaft for connecting said shafts at different speed ratios, said duplex clutch operating at a predetermined speed of the driving shaft to cause a change from a low to a higher speed ratio upon acceleration of the driving shaft and to cause a change from the high back to the lower speed ratio upon deceleration of the driving shaft to a speed less than that at which shifting from the low to the higher speed ratio occurred, and manually operable means for shifting said clutch to produce the lower speed ratio independent of the speed of the driving shaft.

3. A transmission comprising a stationary member, a driving member, a driven member, an internal ring gear rotatably mounted on the driven member, a planet gear carrier splined to the driven member, a sun gear rotatably mounted on the hub of the planet gear carrier and the driven member, a plurality of planet gears carried by the carrier and meshing with the ring gear and sun gear, means for connecting the driving member to the ring gear, a clutch member having two clutch surfaces and a hub portion, the latter being splined to the hub of the sun gear, and means for shifting the clutch member longitudinally on the hub of the sun gear for causing engagement of one of the clutch surfaces with the stationary member when shifted in one direction to thereby hold the sun gear stationary and provide a reduced speed drive of the driven member through the ring gear, planet gears and planet gear carrier and to cause engagement of the other clutch surface with the driving member when shifted in the other direction to thereby provide a direct drive between the driving and driven members.

4. A transmission comprising a stationary member, a driving member, a driven member, an internal ring gear rotatably mounted on the driven member, a planet gear carrier splined to the driven member, a sun gear rotatably mounted on the hub of the planet gear carrier and the driven member, a plurality of planet gears carried by the carrier and meshing with the ring gear and sun gear, means responsive to changes in speed of the driving member for connecting the driving member to the ring gear, a clutch member having two clutch surfaces and a hub portion, the latter being splined to the hub of the sun gear, and means responsive to changes in speed of the driven member for shifting the clutch member longitudinally on the hub of the sun gear for causing engagement of one of the clutch surfaces with the stationary member when shifted in one direction to thereby hold the sun gear stationary and provide a reduced speed drive of the driven member through the ring gear, planet gears and planet gear carrier and to cause engagement of the other clutch surface with the driving member when shifted in the other direction to thereby provide a direct drive between the driving and driven members.

5. A transmission comprising a stationary member, a driving member, a driven member, an internal ring gear rotatably mounted on the driven member, a planet gear carrier splined to the driven member, a sun gear rotatably mounted on the hub of the planet gear carrier and the driven member, a plurality of planet gears carried by the carrier and meshing with the ring gear and sun gear, means for connecting the driving member to the ring gear, a clutch member having two clutch surfaces and a hub portion, the latter being splined to the hub of the sun gear, and means for shifting the clutch member longitudinally on the hub of the sun gear for causing engagement of one of the clutch surfaces with the stationary member when shifted in one direction to thereby hold the sun gear stationary and provide a reduced speed drive of the driven member through the ring gear, planet gears and planet gear carrier and to cause engagement of the other clutch surface with the driving member when shifted in the other direction to thereby provide a direct drive between the driving and driven member, said clutch shifting means being operable upon acceleration of the driven member to produce change from the reduced drive to the direct drive at a predetermined speed and to produce the reverse change upon deceleration of the driven member at a speed less than said predetermined speed.

6. A transmission comprising a stationary member, a driving member, a driven member, an internal ring gear rotatably mounted on the driven member, a planet gear carrier splined to the driven member, a sun gear rotatably mounted on the hub of the planet gear carrier and the driven member, a plurality of planet gears carried by the carrier and meshing with the ring gear and sun gear, means for connecting the driving member to the ring gear, a clutch member having two clutch surfaces and a hub portion, the latter being splined to the hub of the sun gear, means for holding the clutch member in one longitudinally shifted extreme on the sun gear hub to cause engagement of one of the clutch surfaces with the stationary member to thereby hold the sun gear stationary and provide a reduced speed drive of the driven member through the ring gear, planet gears and planet gear carrier and centrifugally operated means for shifting the clutch member to its opposite extreme position to cause engagement of the other clutch surface with the driving member to thereby provide a direct drive between the driving and driven members.

7. In combination, a rotatable driving element, a planetary transmission including a sun gear, an outer ring gear, one or more planet gears meshing with said sun and ring gears, and a rotatable planet-gear carrier on which said planet gears are rotatably mounted, a stationary member, means responsive to the speed of said driving element for operatively connecting the driving element to said ring gear, a clutch member rotatable with said sun gear and movable between two controlling positions to connect said sun gear alternatively with said driving element or with said stationary member, and speed responsive means for controlling the operation of clutch member.

8. In combination, a rotatable driving element, a planetary transmission including a sun gear, an outer ring gear, one or more planet gears meshing with said sun and ring gears, and a rotatable planet-gear carrier on which said planet gears are rotatably mounted, a stationary member, means responsive to the speed of said driving element for operatively connecting the driving element to said ring gear, a clutch member rotatable with said sun gear and movable between two controlling positions to connect said sun gear alternatively with said driving element or with said stationary member, and speed responsive means controlled by the speed of said planet-gear carrier for controlling the operation of said clutch member.

9. The invention set forth in claim 7 with the addition of manually operated means for moving said clutch member into engagement with said stationary member.

10. In a transmission, a driving member, a driven member, a two faced clutch member and means mounted on the driven member for shifting said clutch member to different positions for connecting the driving and driven members in different speed ratios, said means comprising a plurality of fly weights and springs interconnecting adjacent fly weights for assuring uniform action of the fly weights during rotation of the driven member and to cause shifting from a low speed ratio to a high speed ratio at a predetermined speed of the driving member and cause shifting from the high speed ratio to the low speed ratio at a speed less than said predetermined speed.

11. In a transmission, a driving member, a driven member, a two-faced clutch member splined to the driven member and axially shiftable thereon, a ring member rotatably mounted on the clutch member having gear teeth on its outer periphery and a plurality of laterally projecting cam rises, a spider secured to the driven shaft having a plurality of cam followers for cooperation with said cam rises and carrying a plurality of fly weights, each of which weights has a segmental gear part meshing with the teeth on said ring, the fly weights upon movement inwardly or outwardly causing relative rotative movement between the spider and the ring member and also relative axial movement therebetween through the cams and cam followers whereby the clutch member is shifted to produce changes in speed ratios between the driving member and driven member.

12. In a transmission, a driving shaft, a driven shaft, change speed gearing between said shafts operable to change the speed ratios therebetween, a shiftable duplex friction clutch for controlling the action of said gearing and normally operating thereon when in one position to provide a low speed ratio between said shafts, a centrifugally operated clutch for driving the driven shaft from the driving shaft through said gearing at the low speed ratio, and means responsive to change in speed of said shafts and operating to shift the duplex clutch to provide the high speed ratio between said shafts through said gearing and without effecting the operation of the centrifugal clutch so that the driven shaft is driven in the high speed ratio by both of said clutches.

13. In a transmission, a driving shaft, a driven shaft, change speed gearing between said shafts operable to change the speed ratios therebetween, a shiftable duplex friction clutch for controlling the action of said gearing and normally operating thereon when in one position to provide a low speed ratio between said shafts, a centrifugally operated clutch for driving the driven shaft from the driving shaft through said gearing at a low speed ratio, and means responsive to change in speed of said shafts and operating to shift the duplex clutch to provide the high speed ratio between said shafts through said gearing and without effecting the operation of the centrifugal clutch so that the driven shaft is driven in the high speed ratio by both of said clutches, said last mentioned means operating when said shafts have decelerated to a speed less than said low speed ratio to shift said duplex clutch into that position providing the low speed ratio between said shafts through said gearing.

14. In a transmission, an engine driven fly wheel, a driven member and a stationary member, planetary change speed gearing between said fly wheel and driven member, and providing a differential in speed ratio therebetween, a shiftable clutch member for controlling the operation of said gearing in providing the desired speed ratio between the fly wheel and driven member, said clutch having clutch surfaces one for engagement with said stationary member and the other for engagement with said fly wheel, speed responsive means for shifting said clutch member to engage its surface with either the stationary member or fly wheel to control the speed ratio provided by said gearing and a centrifugally operated clutch for connecting a part of said gearing with the fly wheel at a speed above idling speed thereof, said centrifugal clutch operating with the other clutch in driving the driven member at the higher speed ratio through said gearing.

FREDERICK S. DUESENBERG.